(12) United States Patent
Horne

(10) Patent No.: US 7,993,530 B2
(45) Date of Patent: Aug. 9, 2011

(54) SYSTEMS AND METHODS FOR PORTABLE OIL FILTRATION

(75) Inventor: Ronald Horne, Franklin, GA (US)

(73) Assignee: The Southern Company, Atlanta, GA (US)

( * ) Notice: Subject to any disclaimer, the term of this patent is extended or adjusted under 35 U.S.C. 154(b) by 1116 days.

(21) Appl. No.: 11/750,898

(22) Filed: May 18, 2007

(65) Prior Publication Data
US 2007/0266679 A1 Nov. 22, 2007

Related U.S. Application Data

(60) Provisional application No. 60/801,497, filed on May 18, 2006.

(51) Int. Cl.
B01D 37/00 (2006.01)
F01M 11/04 (2006.01)

(52) U.S. Cl. ... 210/767; 210/805; 210/808; 210/167.02; 210/171; 210/172.1; 210/237; 210/238; 210/241

(58) Field of Classification Search .................. None
See application file for complete search history.

(56) References Cited

U.S. PATENT DOCUMENTS

| 1,721,444 | A | * | 7/1929 | Habel | 134/168 R |
|---|---|---|---|---|---|
| 1,829,173 | A | | 10/1931 | Wertz | |
| 1,955,199 | A | * | 4/1934 | Menge | 134/58 R |
| 1,962,463 | A | | 6/1934 | Renfrew | |
| 2,029,232 | A | * | 1/1936 | Green | 137/625.29 |
| 2,222,516 | A | * | 11/1940 | Powell et al. | 134/10 |
| 2,425,848 | A | * | 8/1947 | Vawter | 210/167.31 |
| 2,499,705 | A | * | 3/1950 | Vokes | 184/1.5 |
| 2,510,701 | A | * | 6/1950 | La Cross | 134/95.1 |
| 2,619,974 | A | * | 12/1952 | Daley et al. | 134/56 R |
| 2,635,756 | A | * | 4/1953 | Grieve et al. | 210/95 |
| 2,835,261 | A | * | 5/1958 | Wogan | 134/56 R |
| 3,115,145 | A | * | 12/1963 | Monteath, Jr. | 134/95.1 |
| 3,394,812 | A | * | 7/1968 | Harold al. | 210/134 |
| 3,431,145 | A | * | 3/1969 | Riley | 134/22.18 |
| 3,473,662 | A | * | 10/1969 | Kudlaty | 210/100 |
| 3,489,245 | A | * | 1/1970 | Broadwell | 184/1.5 |
| 4,015,613 | A | * | 4/1977 | Papworth | 134/102.2 |
| 4,059,123 | A | * | 11/1977 | Bartos et al. | 134/102.2 |
| 4,095,673 | A | * | 6/1978 | Takeuchi | 184/1.5 |
| 4,127,160 | A | * | 11/1978 | Joffe | 165/95 |
| 4,181,099 | A | * | 1/1980 | Binstock | 122/448.1 |
| 4,276,914 | A | * | 7/1981 | Albertson | 141/92 |
| 4,606,363 | A | * | 8/1986 | Scales | 134/111 |
| 4,623,455 | A | * | 11/1986 | Adcock | 210/167.04 |
| 4,702,827 | A | | 10/1987 | Wenzel | |
| 4,872,997 | A | * | 10/1989 | Becker | 210/703 |
| 4,991,608 | A | * | 2/1991 | Schweiger | 134/56 R |
| 5,015,301 | A | * | 5/1991 | Baylor et al. | 134/22.1 |
| 5,062,500 | A | | 11/1991 | Miller et al. | |
| 5,076,856 | A | | 12/1991 | Schweiger | |
| 5,091,085 | A | | 2/1992 | Thalmann et al. | |
| 5,098,580 | A | * | 3/1992 | Andersen | 210/745 |

(Continued)

Primary Examiner — Robert James Popovics
(74) Attorney, Agent, or Firm — Ryan A. Schneider, Esq.; Dustin B. Weeks, Esq.; Troutman Sanders LLP

(57) ABSTRACT

The present invention provides systems and methods of portable oil filtration. In an exemplary embodiment, the portable oil filtration system has a portable device body. Mounted on this portable device body are a motor, a pump, an input valve, an output valve, and a filtration device. Additionally, the portable device body is enabled to be carried by a user.

2 Claims, 4 Drawing Sheets

U.S. PATENT DOCUMENTS

| | | | |
|---|---|---|---|
| 5,139,678 A * | 8/1992 | Frederick et al. | 210/641 |
| 5,160,722 A | 11/1992 | Hochella et al. | |
| 5,318,080 A * | 6/1994 | Viken | 141/98 |
| 5,395,514 A | 3/1995 | Siegler | |
| 5,597,601 A | 1/1997 | Griffin | |
| 5,626,170 A * | 5/1997 | Parker | 141/98 |
| 5,772,871 A * | 6/1998 | Lyon et al. | 210/167.02 |
| 6,041,798 A * | 3/2000 | Grigorian et al. | 134/169 A |
| 6,071,355 A * | 6/2000 | Suratt | 134/21 |
| 6,138,722 A | 10/2000 | Willingham | |
| 6,207,051 B1 * | 3/2001 | Anderson et al. | 210/237 |
| 6,213,133 B1 * | 4/2001 | Reicks | 134/22.1 |
| 6,247,325 B1 | 6/2001 | Muston et al. | |
| 6,302,167 B1 * | 10/2001 | Hollub | 141/98 |
| 6,305,393 B1 * | 10/2001 | Lin | 134/169 R |
| 6,309,169 B1 * | 10/2001 | Carlile | 414/498 |
| 6,378,657 B2 * | 4/2002 | Viken | 184/1.5 |
| 6,379,540 B2 * | 4/2002 | Reicks | 210/139 |
| 6,485,634 B2 * | 11/2002 | Warren et al. | 210/85 |
| 6,596,174 B1 * | 7/2003 | Marcus | 210/695 |
| 6,615,866 B2 * | 9/2003 | Cook | 137/565.19 |
| 6,752,159 B1 * | 6/2004 | Kavadeles et al. | 134/22.12 |
| D493,593 S * | 7/2004 | Anderson | D34/14 |
| 6,779,633 B2 * | 8/2004 | Viken | 184/1.5 |
| 6,796,339 B1 * | 9/2004 | Petty | 141/65 |
| 6,863,827 B2 * | 3/2005 | Saraceno | 210/748.11 |
| 6,883,526 B1 * | 4/2005 | Betancourt et al. | 134/22.1 |
| 6,923,190 B1 * | 8/2005 | Kavadeles et al. | 134/22.18 |
| 7,033,513 B2 * | 4/2006 | Riggins et al. | 210/805 |
| D520,595 S * | 5/2006 | Johnson et al. | D23/207 |
| D521,593 S * | 5/2006 | Mitsis | D23/207 |
| 7,056,442 B2 * | 6/2006 | Hansen | 210/805 |
| 7,150,286 B2 * | 12/2006 | Apostolides | 137/14 |
| 7,179,390 B1 * | 2/2007 | Layton | 210/767 |
| 7,223,337 B2 * | 5/2007 | Franzino et al. | 210/241 |
| 7,282,156 B2 * | 10/2007 | Franzino et al. | 210/767 |
| 7,354,511 B2 * | 4/2008 | Becker | 210/167.02 |
| 7,510,662 B1 * | 3/2009 | Hansen | 210/805 |
| 7,546,842 B2 * | 6/2009 | Llorente Gonzalez et al. | 134/111 |
| 2004/0256332 A1 * | 12/2004 | Riggins et al. | 210/805 |
| 2007/0045203 A1 * | 3/2007 | Franzino et al. | 210/805 |
| 2007/0119789 A1 * | 5/2007 | Layton | 210/805 |

* cited by examiner

SYSTEMS AND METHODS FOR PORTABLE OIL FILTRATION

CROSS REFERENCE TO RELATED APPLICATION

This application claims the benefit of U.S. Provisional Application No. 60/801,497 filed 18 May 2006, which is hereby incorporated by reference in its entirety as if fully set forth below.

FIELD OF THE INVENTION

The present invention relates to systems and methods for portable oil filtration and, more particularly, to a filtering contaminants from the oil of the systems, apparatus, and equipment used in a power plant.

BACKGROUND OF THE INVENTION

Fuel-based power plants contribute a significant amount of the total power generation in the U.S. In fact, a large portion of electricity produced in the U.S. comes from power plants that burn coal. In addition to coal, power plants are fired by fuels such as natural gas and petroleum. This significant generation of power by fuel-based power plants is facilitated by large-scale power generation equipment, which operates in extreme conditions for extended periods of time. These power plants are subject to strict guidelines, restrictions, and performance parameters. Therefore, power plant equipment and machinery must be meticulously maintained to ensure guideline compliance, operational efficiency, and safety.

One important task in maintaining power plant equipment is ensuring the integrity of the lubricating oil in power plant equipment. As these pieces of equipment are subject to extended periods of high stress use, the lubricating oil is therefore subject to a significant amount of contamination. For example, forced draft fans are large mechanical fan units used in the combustion system of a power plant to force oxygen into the boiler of the combustion system. The normal operation of these forced draft fans results in suspended contaminants in the lubricant oil of the bearing housing and drive units of the forced draft fans. The suspended contaminants may include quantities of sulfur, iron, copper, chromium, lead, aluminum, silicon, sodium, molybendum, tin, and silver. The contaminants and solids in suspension in the lubricant oil may be abrasive to the machinery in the forced draft fan unit. These contaminants must be regularly filtered from the lubricant oil or the oil must be replaced.

While it is important to maintain the integrity of the lubricant oil in the power plant machinery, it is also important to minimize the downtime that may result from the service of that machinery. Thus, it is advantageous to be able to service the equipment of the power plant in the vicinity of that equipment in order to minimize or even eliminate the downtime of the equipment and increase the efficiency of the filtration process.

Conventional methods by which to filter oil in the vicinity of the equipment to be serviced are typified in various U.S. patents, including U.S. Pat. No. 1,829,173 to Wertz., U.S. Pat. No. 2,425,848 to Vawter, U.S. Pat. No. 5,076,856 to Schweiger, U.S. Pat. No. 5,597,601 to Griffin, U.S. Pat. No. 6,247,325 to Muston, U.S. Pat. No. 5,091,085 to Thalmann, U.S. Pat. No. 5,395,514 to Siegler, U.S. Pat. No. 5,160,722 to Hochella, U.S. Pat. No. 6,138,722 to Willingham, U.S. Pat. No. 1,962,463 to Renfrew, U.S. Pat. No. 4,702,827 to Wenzel, and U.S. Pat. No. 5,062,500 to Miller et al. For instance, U.S. Pat. No. 1,829,173 to Wertz discloses a flushing device and lubricant dispenser adapted for cleaning and flushing automotive transmissions. The patent discloses a wheeled device with a tank, a pump, an intake pipe for the pump, and a discharge conduit having a injector. The device is a wheeled device, which utilizes a rotary pump "10" and an injector "16" to pump flushing oil into the transmission and create suction in a discharge line. In accordance with the disclosure, the device is also provided with a means for filtering and separating solid particles from the diluted lubricant removed from the transmission.

U.S. Pat. No. 2,425,848 to Vawter discloses a flushing and filtering unit for use in cleaning moving or working parts in machinery. The disclosed device has a tank for holding flushing oil or lubricant, a pump, filters, and connecting conduits. The unit is capable of circulating fluid having contaminating material in suspension and filtering the contaminating material from the fluid. The majority of the embodiments disclosed involve circulating a flushing oil through a piece of machinery and then filtering the collected dirt and solid material from the flushing oil.

U.S. Pat. No. 5,076,856 to Schweiger discloses a method for removing contaminated oil and contaminants from heat exchangers. In one embodiment, an apparatus is used which provides a pump, filter canisters, and conduits on a wheeled frame. The method disclosed involves using the apparatus to pump solvent through a heat exchanger in a direction opposite the normal direction of flow; stopping the flow of solvent for a period of time; flowing air under pressure through the heat exchanger in a direction opposite the normal flow; pumping oil through the heat exchanger in the normal direction of flow; stopping the flow; and subsequently flowing air under pressure in the normal direction.

U.S. Pat. No. 5,597,601 to Griffin discloses an apparatus and process for on-site filtering of the cooking oil of a deep fat fryer. The apparatus disclosed includes a chasis mounted on casters containing an auxiliary reservoir "22", canisters "96", filters "112", an input suction line "150", a pump "148", and a dispensing hose "90". The apparatus is used to filter solid particles from the cooking oil of a deep fat fryer vat at the location of the vat, by draining the oil from the vat, pumping the oil through renewable filter elements, and then dispensing the cleaned oil back into the vat.

U.S. Pat. No. 6,247,325 to Muston et al. discloses an apparatus for servicing a refrigeration system. In one disclosed embodiment, the apparatus consists of a support frame having wheels mounted on its lower end. Multiple chambers are mounted within the housing means of the apparatus, including an accumulator chamber, condenser chamber, high and low pressure filter chambers, and a fluid control means. The apparatus is disclosed as enabling flow between these chambers to facilitate the removal or return of refrigerant. In one embodiment the filter provided is an annular filter "70", which serves to filter out water molecules or droplets from the refrigerant. The apparatus is disclosed as enabling service of a refrigerant system without loss of the refrigerant agent to the atmosphere.

U.S. Pat. No. 5,091,085 to Thalmann et al. discloses a ultrafiltration device to be used in filtering waste water. The unit includes a prefilter, a pump, a membrane filter cartridges containing membrane elements, a temperature sensor means, a pressure sensor means, and a process interdiction and control means, which are all mounted to a wheeled support frame. In one embodiment, the circulating pump "22" moves waste water through an input line "15" and through the filtration membrane of cartridge "26", enabling the oil or other larger molecule liquid to be filtered from the water.

U.S. Pat. No. 5,395,514 to Siegler discloses an ultrafiltration device for the separation of water from mixtures with larger molecule liquids. Siegler discloses a device which incorporates, a centrifugal pump, membrane filter cartridges, an eductor means, a return means, a waste outlet, and a means for controlling the device. The patent discloses a device that pumps waste mixtures at a high pressure through an ultrafiltration membrane with a centrifugal pump; thereby, separating water from larger molecule liquids, such as oils, coolants, and antifreeze, to obtain water with less than 50 ppm of larger molecule contaminant.

U.S. Pat. No. 5,160,722 to Hochella et al. discloses a method for the catalytic oxidation of ammonia in which the catalyst used is a gauze material of wire mesh. The disclosed method involves passing the ammonia through this wire mesh to convert and oxidize the ammonia into nitric acid. In the embodiments disclosed, the wire mesh filter has a specifically delineated curve to flat ratio in relation to the mesh count per inch and wire diameter.

U.S. Pat. No. 6,138,722 to Willingham discloses an apparatus for reconditioning the drivetrain unit fluid of a motor vehicle. In one embodiment, Willingham provides a portable apparatus which contains a hose "12" with an extraction tube "30" and a discharge tube "34", a pump "14", and a filter "16". The apparatus enables extraction of the drivetrain unit fluid from the drivetrain unit. The fluid may then be transmitted to the pump, pressurized by the pump and caused to pass through the filter, and then propelled back into the drive train unit.

U.S. Pat. No. 1,962,463 to Renfrew discloses an apparatus for removing impurities from insulating and lubricating oils to restore the efficiency of the oil. The apparatus provides an electric motor, multiple pumps, a filter, and lines for receiving and distributing oil. The device is enabled to connect with a device containing contaminated oil, pump the oil from the device, pass the oil under pressure through the filter, vacuum the oil to the discharge ends, and return the liquid to the serviced device.

U.S. Pat. No. 4,702,827 to Wenzel discloses a filter for cooking apparatus including a power supply, filter operation mode, pump, wand, heater, and control circuitry. The device disclosed in Wenzel addresses a problem encountering with previous portable filters used in cleaning cooking oil fryers. The patent discloses that many of the conventional devices provide an independent heating element to be used in heating the oil to a liquid flowable temperature, and these heating elements pose a fire hazard. The Wenzel device discloses a portable filter apparatus configured with switching means to intelligently disable the heating element of the apparatus during dangerous modes of operation.

U.S. Pat. No. 5,062,500 to Miller et al. discloses a low profile cart for the collection, filtration, and recycle of fluid from machinery. The low profile cart is equipped with a fluid receiving chamber, a pump, a filter, and a means for manually positioning the cart. The cart is provided with a low profile so as to be enabled to be placed underneath a piece of machinery, such as a vehicle or farm equipment. Thereby, the fluid containers of the machinery may drain directly into the chamber of the filter device.

While suitable for their intended purposes, the filtration systems and methods of the prior art are, for the most part, large, heavy, and bulky. Even though many are provided on wheeled carts, their portability is limited. The filtration machines of the prior art are not lightweight or compact, much less capable of being carried by a user. Furthermore, many of the prior art machines incorporate a reservoir to hold either new, discharged, or contaminated fluid. The reservoir significantly limits the portability and capability of the filtration system.

Additionally, the problem encountered in the conventional methods and systems of filtering the lubricant oil of power plant machinery and equipment arises from the need to take the equipment out of of operation for extended periods of time in order to service the equipment. This is an especially large problem with power plant equipment, which may remain in operation for lengthy time periods. For example, the problem encountered in the conventional method of filtering the lubricant oil of forced draft fans arises from the need to take the forced draft fans out of operation for extended periods of time in order to remove the fan to access the lubricant oil contained in the bearing housing and drive unit of the forced draft fan. Both the service time required to perform this operation and the inoperability associated with the service are highly costly to the power plant. What is needed, therefore, is an apparatus or system that is capable of servicing the power plant equipment either without taking the equipment out of service or with minimal downtime to that equipment.

Furthermore, a filtration system is highly desired that is capable of filtering the lubricating oil of power plant machinery without creating cavitation in the lubricating oil of the machinery. Cavitation due to filtration results when either air or vapor bubbles form in lubrication oil as a result of the filtering process and are subsequently emploded in the either the machinery or the filtering pump by the pressurized oil. This leads to microjets of oil pounding and eroding adjacent surfaces, thus deteriorating the filtering equipment and the machinery being serviced.

The methods and systems and disclosed in the prior art do not teach a filtering device capable of overcoming the known problems. Therefore a need exists for a system that will enable users to overcome the problems of the prior art and allow users to efficiently and effectively service and recondition the lubricant oil of power plant machinery.

BRIEF SUMMARY OF THE INVENTION

The present invention provides systems and methods of portable oil filtration. In an exemplary embodiment, the portable oil filtration system has a portable device body. Mounted on this portable device body are a motor, a pump, an input valve, an output valve, and a filtration device. Additionally, the portable device body is enabled to be carried by a user.

An exemplary embodiment of the portable oil filtration system may be sufficiently mobile and compact so as to be capable of being manually transported to a position adjacent to a particular piece of equipment to be serviced. An exemplary embodiment of the portable oil filtration system may quickly and effectively recondition the oil of the equipment without shutting down the equipment and without creating cavitation in the oil serviced.

These and other objects, features and advantages of the present invention will become more apparent upon reading the following specification in conjunction with the accompanying drawing figures.

DETAILED DESCRIPTION OF PREFERRED EMBODIMENTS

Figure 1:
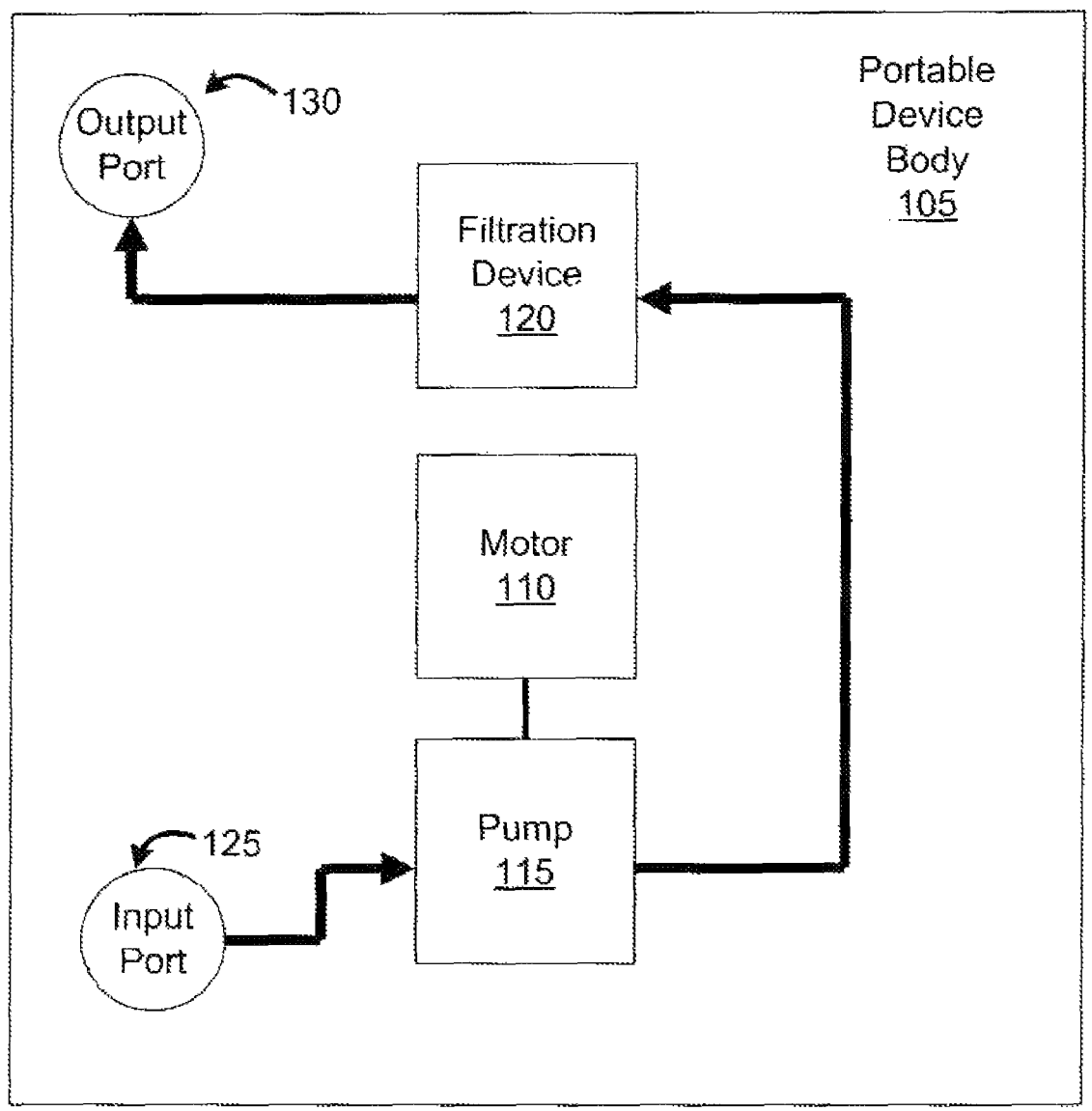
FIG. 1 depicts a block diagram of a portable oil filtration system, in accordance with a preferred embodiment of the present invention.

To facilitate an understanding of the principles and features of the invention, it is explained hereinafter with reference to its implementation in an illustrative embodiment. In particular, the invention is described in the context of being a portable oil filtration system capable of being carried by the user to a position proximate the device to be filtered.

The device components described hereinafter as making up the various elements of the invention are intended to be illustrative and not restrictive. Many suitable components that would perform the same or a similar function as the components described herein are intended to be embraced within the scope of the invention. Such other components not described herein can include, but are not limited to, for example, components that are developed after the time of the development of the invention.

An exemplary embodiment of the present invention provides a portable oil filtration system. The portable oil filtration system includes a portable device body having a motor, a pump in communication with the motor, an input valve in communication with the pump, a filtration device in communication with the pump, and an output valve in communication with the at least one filtration device. The portable device body is enabled to be carried by a user.

The portable oil filtration system of the present invention is capable of overcoming the problems of the prior art. Prior to the present invention, many components of a power plant system could only receive service to their lubricant oil when shutdown. For example, and not limitation, the bearing housing of a forced draft fan of a power plant system could previously only be serviced with the forced draft fan shutdown. Shutting down the forced draft fan and servicing the oil contained in the bearing housing required an eight hour procedure. Therefore, the entire block of the power plant system connected the combustion chamber of the forced draft fan would have to be shutdown for eight hours in order to service the forced draft fan or the operator of the power plant system would be forced to wait for a system wide shutdown to service the forced draft fan. Downtime for the power plant system results in a significant loss of power generation capacity (on the order of hundreds of megawatts of power), and thus a loss of valuable time and money. The portable oil filtration system of the present invention enables equipment within the power plant system to be serviced while in operation; thus, saving time and money and minimizing power generation loss.

In a non-limiting example, the portable oil filtration system of the present invention may be used to service the forced draft fans of a power plant system. In an exemplary embodiment the user may pick up the portable oil filtration system by its handle and carry the system up a ladder to the vicinity of the bearing and drive units of the forced draft fan. A high pressure hose may be connected to the drain port of the forced draft fan and to the input port of the portable oil filtration system. Another high pressure hose may be connected to the output port of the portable oil filtration system and to the input port for the oil in the bearing housing of the forced draft fan. Once fully connected, the motor may be powered up, the portable oil filtration system may be pre-charged to a pressure equivalent to that of the bearing housing of the forced draft fan. Once pressurized, the valves of the portable oil filtration system can be opened, and the filtering process may be conducted without interruption in operation of the forced draft fan.

In an exemplary embodiment, the portable oil filtration system enables a slow flow filtration of the bearings and drive unit of a forced draft fan at a flow rate in the range of ½ to 5 gallons per minute, and preferably at around one gallon per minute. Filtration at a relatively slow flow rate enables efficient filtration of the lubricant oil of the forced draft fan without cavitation. Therefore, the oil of the forced draft fan may be fully reconditioned without inducing harmful cavitation in the drive system. The portable oil filtration system enables the user to reliably maintain the integrity of the oil of the forced draft fan.

In addition to the efficiencies presented by the ability to service power plant system equipment while in operation, the portable oil filtration system of the present invention enables significant savings in oil and lubricant costs. Using prior art methods, the oil for certain power plant system equipment would be replaced during service to that equipment. The terms equipment, machine, and device are used interchangeably herein to refer to a mechanical system or set of components. In an non-limiting example, the prior art method of servicing the oil in the bearing housing of a forced draft fan involved shutting down the forced draft fan, draining the oil form the bearing housing, and inserting new oil into the bearing housing. Therefore, the prior methods required new oil to be purchased for every service. The method of oil filtration, enabled by the embodiments of the present invention, reconditions the oil instead of replacing it. In an exemplary embodiment of the present invention, the portable oil filtration system filters the contaminants from the existing oil contained in the bearing housing; thus, no new oil is required. Reconditioning the oil saves the significant cost of replacing the oil.

Referring now to the figures, wherein like reference numerals represent like parts throughout the figures, the present portable oil filtration system will be described in detail.

FIG. 1 depicts a block diagram of a portable oil filtration system 100 in accordance with one embodiment of the present invention. The portable oil filtration system 100 may have a portable device body 105 on which the components of the system are mounted. A motor 110 may be carried by the portable device body 105. A pump 115, driven by the motor 110, may also be carried by the portable device body 105. Additionally, an input port 125 may be connected to the pump 115. Furthermore, the pump 115 may be connected to inlet of a filtration device 120. An output port 130 may be connected to the outlet of the filtration device 120. The motor 110 may be enabled to power the pump to draw oil in through the input port 125, pass the oil through the filtration device 120, and expel the oil from the system through the output port 130. Moreover, the portable oil filtration system 100 may be enabled to pass a quantity of oil through the filtration device 120 at a rate of less than five gallons per minute. Also, a user may be enabled to carry the portable device body 105.

Those of skill in the art will appreciate that the components portable oil filtration system 100 may be configured in a variety of different embodiments in addition to the embodiment illustrated in FIG. 1. For example and not limitation, the portable oil filtration system 100 may have multiple filtration devices, such as filtration device 120. In an alternative embodiment, the motor 110 may not be located on the portable device body 105 and the pump 115 may be driven by a power source external to the portable oil filtration system 100. In yet another embodiment, the motor 110 and pump 115 are part of one contiguous device. Furthermore, those of skill in the art will also appreciate that the portable oil filtration system 100 may be implemented to incorporate many additional components not illustrated in FIG. 1. In a non-limiting example, the portable oil filtration system 100 could be configured with one or more automatic particle counter devices enabled to give real time data concerning the density and dimension of the contaminants in the oil to be serviced. These automatic particle counter devices could be configured for embodiments of the portable oil filtration system 100 to be used in applications in which it was desired to provide continuous measurement of the solid contaminants in the oil serviced.

Figure 2:
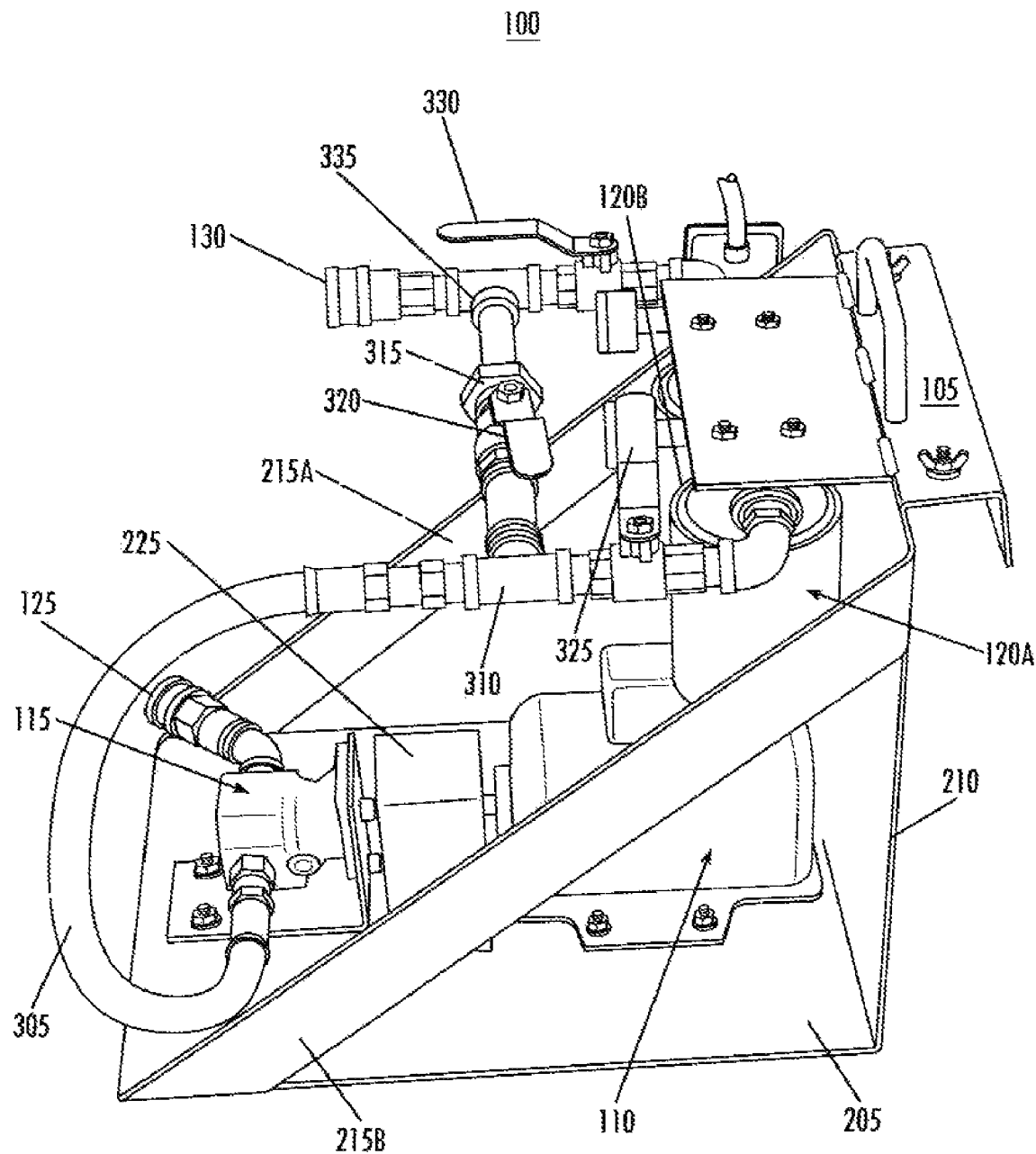
FIG. 2 depicts a side view of an embodiment of the portable oil filtration system, in accordance with a preferred embodiment of the present invention.

FIG. 2 depicts a side view of an embodiment of an exemplary embodiment of the portable oil filtration system 100. The exemplary embodiment of portable oil filtration system 100 depicted in FIG. 2 has a portable device body 105. The portable device body 105 may be made of a rigid lightweight material, such as alloy, metal, polymer material, or many other materials. In an exemplary embodiment the portable device body 105 is made of brushed metal, which provides sufficient rigidity, while being lightweight and resistant to corrosion by the oils to be serviced. The portable device body 105 may provide a frame upon which the components of the portable oil filtration system 100 may be mounted. In the exemplary embodiment depicted in FIG. 2, the portable device body 105 has a horizontal support member 205 and vertical support member 210. Additionally, the portable device body 105 may have braces to provide support and rigidity. In the exemplary embodiment depicted in FIG. 2, the portable device body 105 has braces 215A and 215B, which extend from the outermost edge of the horizontal support member 205 to the outermost edge of the vertical support member 210. The horizontal support member 205, vertical support member 210, and braces, 215A and 215B, may define the external frame of the portable device body 105. Those of skill in the art will appreciate that the portable device body 105 can be configured in a variety of ways from a variety of materials.

The portable device body 105 may be constructed to be sufficiently narrow, making the portable oil filtration system 100 compact. The compact size of certain embodiments of the portable oil filtration system 100 enables many benefits, such as transport into confined areas. One of the desired features of the portable oil filtration system 100, is its ability to be placed in the vicinity of the machine to be serviced. Often times the areas surrounding the machines are small and confined. Therefore, the portable oil filtration system 100 may be sufficiently compact to fit into these areas. In some embodiments, the width of the portable oil filtration system 100 may be in the range of 15 to 25 inches wide. Thus, the distance from brace 215A on the left side of the portable device body 105 to brace 215B on the right side of the portable device body 105 (the overall width of the portable device body 105) may be in the range of 15 to 25 inches. In an exemplary embodiment, the width from brace 215A to brace 215B is 16 to 17 inches.

In addition to its relatively narrow dimensions, an exemplary embodiment of portable oil filtration system 100 of the present invention can be configured to be relatively light in weight. More particularly, an exemplary embodiment of the portable oil filtration system 100 can be less than fifty pounds, and preferably around forty pounds in total weight. Thus, the relatively small dimensions and small weight of an exemplary embodiment of the portable oil filtration system 100 enable it to be picked up and carried by a user. In other words, an exemplary embodiment of the portable oil filtration system 100 is of sufficient dimension and weight to be carried by a user and walked to a location proximate to a piece of equipment to be serviced. Therefore, this exemplary embodiment of portable oil filtration system 100 has to be light enough to be picked up and small enough to enable it to be carried. The ability to hand carry an exemplary embodiment of the portable oil filtration system 100 is one of the significant benefits provided by the present invention. The lightweight and small dimension of an exemplary embodiment of the portable oil filtration system 100 allow a user to place it sufficiently close to a unit to be serviced and thereby increase the efficiency of the oil filtration process and allow for the reconditioning of oil in equipment during operation of that equipment. The collocation of the portable oil filtration system 100 minimizes the distance the lubricant to be filtered must travel; thereby, reducing the stress placed on a system during the filtration process. In addition, the collocation permits more rapid and precise filtration of the contaminants from the oil in the equipment being serviced. The lightweight and compact characteristics of the portable oil filtration system 100 enable a multitude of uses that are not possible with the systems in the prior art.

The portable oil filtration system 100 may include a motor 110. The motor 110 may be mounted to the portable device body 105. In the embodiment depicted in FIG. 2, the motor 110 is mounted to the horizontal support member 205 of the portable device body 105. The motor 110 may be many suitable types of pump motors that are sufficiently light in weight. In some embodiments, the motor 110 may be a small horsepower motor. For example, and not limitation, the motor may be in the range of a one-half horsepower motor to a five horsepower motor. Those of skill in the art will appreciate that the size of motor 110 can be adjusted in accordance with the applications in which the portable oil filtration system 100 is be to used. In a non-limiting example, a portable oil filtration system 100 can be configured to filter oil at a rate of one gallon per minute; thus, the portable oil filtration system 100 can be provisioned with a three-quarter horsepower motor 110. In an alternative embodiment, a portable oil filtration system 100 can be configured to filter oil at a rate of five gallons per minute; thus, the portable oil filtration system 100 can be provisioned with a three horsepower motor 110. The motor 110 may be powered by many conventional current ratings, such as 100 to 115 volts. In an exemplary embodiment, the motor 110 is powered by a 115 volt single faced supply and is a three-quarter horsepower motor.

The portable oil filtration system 100 may include a pump 115. The pump 115 may be mounted to the portable device body 105. In the exemplary embodiment depicted in FIG. 2, the pump 115 is mounted to the horizontal support member 205, proximate the motor 110. The pump 115 may be mechanically connected to the motor 110 and, thereby, driven by the motor 110. The pump 115 may be many types of pumps suitable for moving fluid, such as a gear pump, diaphragm pump, or centrifugal pump. In the exemplary embodiment depicted in FIG. 2, the pump 115 is a gear pump that is mechanically connected to the motor 110. The pump 115 may be connected to the motor 110 by a coupling 225. The coupling 225 may be protected by a coupling guard.

The pump 115 may be connected, through conduit, to a filtration device 120. By pumping contaminated oil through the filtration device 120, the contaminants may be removed and the oil may be reconditioned. The filtration device 120 may be many types of filters suitable to remove contaminants in oil. For example and not limitation, the filtration device 120 may be a membrane filter, cellulose filter, or a charcoal filter. Additionally, the pore size of the filtration device 120 may be varied depending upon the parameters of the filtration process desired. A larger pore size may be used to filter solid contaminants, and a smaller pore size may be used to filter smaller contaminants contained in the oil. The filtration device 120 may also be implemented as a combination of different types of filters, as different types of filters are more suited for filtering certain types of contaminants.

Some embodiments of the portable oil filtration system 100 may implement multiple filtration devices. In the exemplary embodiment depicted in FIG. 2, the portable oil filtration system 100 has two filtration devices, 120A and 120B. The contaminated oil may be passed through each of the filtration devices, 120A and 120B, to provide the desired filtration. Each of the filtration devices, 120A and 120B, may be configured to filter a particular type of contaminant. In one exemplary embodiment, the filtration device 120A is a membrane filter configured with relatively larger pore size filter paper. In that same exemplary embodiment, the filtration device 120B is a membrane filter configured with relatively smaller pore size filter paper. Therefore, the contaminated oil may first be passed through filtration device 120A to filter out the large size contaminants entrained in the oil, such as solid particles. The contaminated oil may then be passed through filtration device 120B to filter out the smaller size contaminants entrained in the oil. In one exemplary embodiment, the filtration device 120A may be configured with a 3 micron paper filter to filter out larger materials and the filtration device 120B may be configured with a 3 micron absolute paper filter to filter out smaller particles.

Prior art filtration machines often create destructive cavitation in the filtering systems and the systems to be serviced. Cavitation due to filtration results when either air or vapor bubbles form in lubrication oil as a result of the filtering process and are subsequently imploded in the either the machinery or the filtering pump by the pressurized oil. This leads to microjets of oil pounding and eroding adjacent surfaces, which deteriorates the filtering equipment and the machinery being serviced. Thus it is highly desired to avoid cavitation in servicing equipment with the portable oil filtration system 100. The pump 115 and motor 110 of the portable oil filtration system 100 may be configured to pump the contaminated oil at a relatively low rate to avoid cavitation. In some embodiments, the pump 115 and motor 110 may be configured to pump in the range of 0.5 gallons per minute ("gpm") to 5 gpm. In an exemplary embodiment, the pump 115 and motor 110 may be configured to pump at 1 gpm. Filtration at this relatively low flow rate prevents the creation of cavitation in the system, while at the same time enabling efficient and effective filtration of the oil to be serviced.

One of the highly desired features of an exemplary embodiment of the portable oil filtration system 100 is the ability to pre-charge the system to pressure levels equivalent to the pressure levels of the equipment to be serviced. The ability to pre-charge the portable oil filtration system 100 enables seamless connectivity to the equipment to be serviced. For example, in the exemplary embodiment of the portable oil filtration system 100, shown in FIG. 2, the pump 115 and motor 110 can be activated prior to opening the valves of the system 100. Activation of the pump 115 and motor 110 can bring the portable oil filtration system 100 to a desired pressure level, which is equivalent to the pressure level of the equipment to be serviced. Thereby, when the valves of portable oil filtration system 100 are opened, the oil in the equipment being serviced remains at a constant pressure, preventing a disruption in the operation of the equipment and damage to the equipment.

Figure 3:
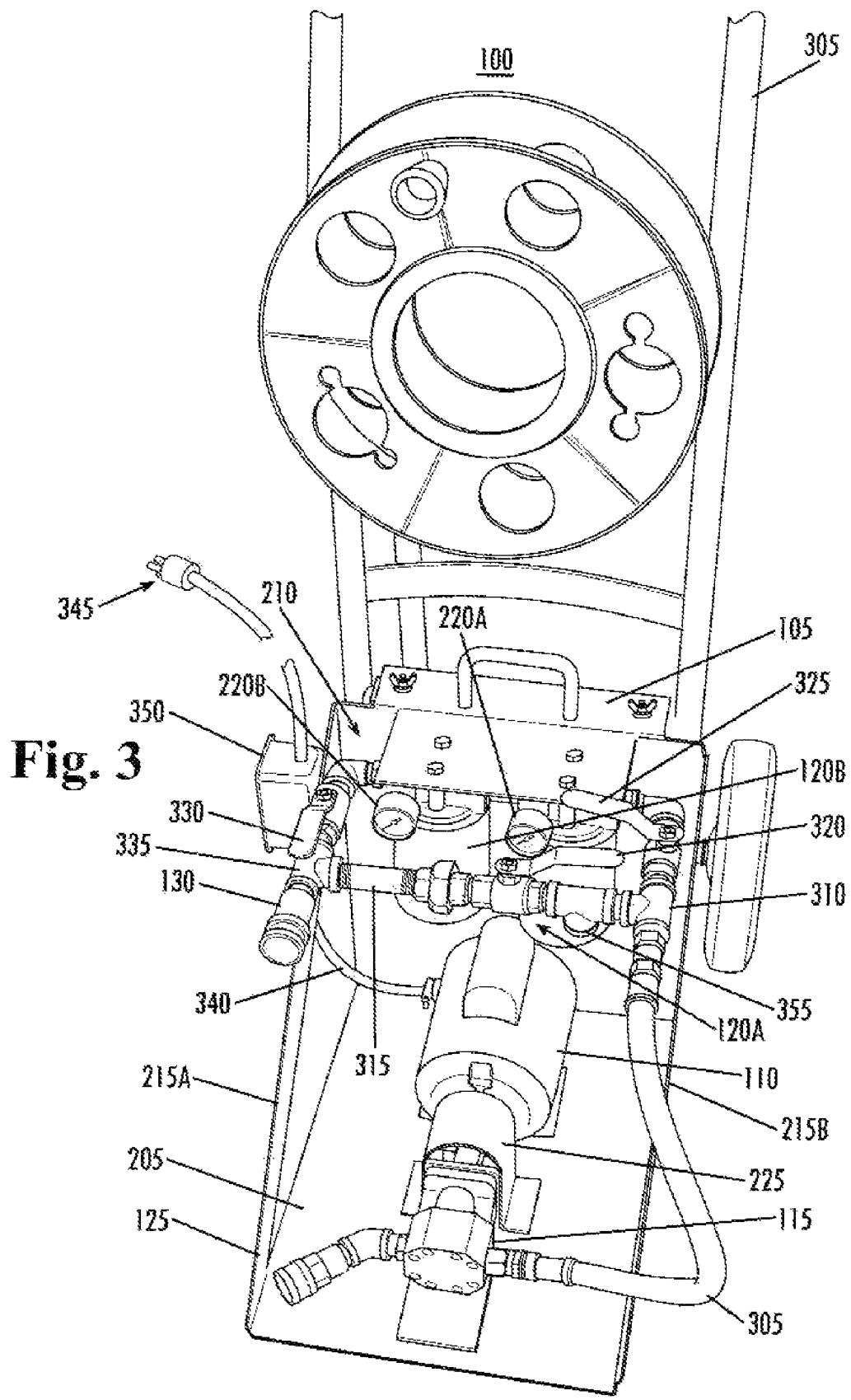
FIG. 3. depicts a front view of an embodiment of the portable oil filtration system, in accordance with a preferred embodiment of the present invention.

FIG. 3 depicts a front view of an exemplary embodiment of the portable oil filtration system 100. As shown in FIG. 3, the portable oil filtration system 100 may be provided with a transport device 305. The portable oil filtration system 100 may be detachably connected to the transport device 305. This transport device 305 may be many types of devices capable of transporting the portable oil filtration system 100, such as a cart, dollie, trolley, or other wheeled apparatus. In the exemplary embodiment depicted in FIG. 3, the transport device 305 is a conventional set of hand trucks. The transport device 305 of the portable oil filtration system 100 can enable the user of the system 100 to easily transport the system 100 to a location proximate to the equipment to be serviced by the portable oil filtration system 100. In an exemplary embodiment, the portable oil filtration system 100 can be easily transported by just one user with the transport device 305.

As illustrated by the embodiment depicted in FIG. 3, the portable oil filtration system 100 may be configured with a network of conduit for passing the oil through the system. In the exemplary embodiment depicted in FIG. 3, the input port 125 is a quick connect fitting. This quick connect fitting enables the user to easily connect a hose, such as a high pressure hose, from the drain port of the machine to be serviced to the quick connect fitting of the input port 125. The input port 125 may be connected to the inlet of the pump 115. The outlet of the pump 115 may be connected to a conduit directed toward the filtration device 120A. In the exemplary embodiment depicted in FIG. 3, the outlet of the pump 115 is connected to a high pressure hose 305. The high pressure hose 305 may be many varieties of hose capable of passing the contaminated oil at the necessary pressures. In one embodiment the high pressure hose 305 is a 35 psi hydraulic hose.

In the exemplary embodiment depicted in FIG. 3, the output port 130 is a quick connect fitting. This quick connect fitting enables the user to easily connect a hose, such as a high pressure hose, from the input port of the machine to be serviced to the quick connect fitting of the output port 130. A machine to be service may be connected via hoses to the input port 125 and the output port 130 of the portable oil filtration system 100. Therefore, the pump 115 may draw contaminated oil from the machine to serviced, pump it through the portable oil filtration system 100, and pump the reconditioned oil back into the machine being serviced.

In an exemplary embodiment, the portable oil filtration system 100 can be configured to a pre-charged pressure level that is equivalent to the pressure of the oil in the equipment to be serviced. Thereby, in this exemplary embodiment, the portable oil filtration system 100 can be inserted into the equipment system to be serviced without deactivating the equipment and without damaging its components. More particularly, the portable oil filtration system 100 can connected to the equipment to be serviced, the motor 110 and pump 115 can be activated, and the portable oil filtration system 100 can be pressured to a desired level before opening the valves of the portable oil filtration system 100 to the equipment to be serviced. Thereby, when the valve 325 is turned into the "on" position, the portable oil filtration system 100 can immediately begin extracting oil, via input port 125, from the equipment to be filtered and output oil, via output port 130, at a pressure equivalent to that of the equipment being serviced. In this manner, the equipment being serviced is never deprived of oil. Therefore, the equipment can be serviced while in operation without damage to the equipment.

Some embodiments of the portable oil filtration system 100 may be provided with a bypass system, which allows the user to configure the portable oil filtration system 100 such that inputted oil may flow through the system without passing through the filtration device 120. The bypass system of the portable oil filtration system 100 may allow the user to sample the oil to determine the contamination state of the oil. In the exemplary embodiment shown in FIG. 3, the bypass conduit 315 provides a sample port 355, from which oil can be extracted from the portable oil filtration system 100. Additionally, the user may utilize the bypass system to reroute the passage of oil while replacing a filter, without interrupting the operation of the equipment being serviced.

The exemplary embodiment of the portable oil filtration system 100 depicted in FIG. 3 is configured with a bypass conduit 315. In this exemplary embodiment, the high pressure hose 305 may be connected to a "T" shaped pipe fitting 310. This "T" shaped pipe fitting 310 permits the flow of oil to both the filtration devices, 120A and 120B, and the bypass conduit 315. The bypass conduit 315 may provide a valve 320 for regulating the flow of oil. This valve 320, along with the other valves incorporated into the portable oil filtration system 100, may be many types of valves suitable for regulating the flow of fluids through a conduit. In the exemplary embodiment depicted in FIG. 3, the valve 320 is a quarter turn ball valve. When the valve 320 is placed in the "off" position, no oil is permitted to flow through the bypass conduit 315. The "T" shaped pipe fitting 310 is also connected to another valve 325. The valve 325 may regulate the flow of oil to the filtration devices, 120A and 120B. When the valve 320 is placed in the "off" position and the valve 325 is placed in the "on" position, then the oil passed through the pump 115 flows only to the filtration devices, 120A and 120B.

The output of the filtration devices, 120A and 120B may be connected to a valve 330. The valve 330 is connected to a second "T" shaped pipe fitting 335. The second "T" shaped pipe fitting 335 connects the bypass conduit 315 and the output from the filtration device 120B to the output port 130. When the both valves 325 and 330 are placed in the "off" position and the valve 320 is placed in the "on" position, then the oil passed through the pump 115 flows through the bypass conduit 315 without being filtered.

The motor 110 of the portable oil filtration system 100 can be driven by a variety of different power sources. One embodiment of the portable oil filtration system 100 provides a gasoline powered motor 110. In this embodiment, the motor 110 is powered by a gasoline reservoir. In another embodiment of the portable oil filtration system 100, the motor 110 is an electrically powered motor. In the exemplary embodiment depicted in FIG. 3, the motor 110 is an electrically powered motor that is electrically connected to a power source via an electrical conduit 340 which terminates in plug 345. A switch 350 is interposed in the electrical conduit 340 to permit user to cycle power to the motor 110.

As illustrated by the embodiment depicted in FIG. 3, the filtration device 120 may also be configured with one or more pressure gauges. The pressure gauges allow the user of the portable oil filtration system 100 to determine the level of pressure within the filtration device 120. Certain pressure levels within the filtration device 120 indicate that the filter has reached saturation and is no longer filtering out contaminants. In the exemplary embodiment depicted in FIG. 2, each filtration device, 120A and 120B, is configured with a pressure gauge, 220A and 220B. These pressure gauges, 220A and 220B, may permit the user to monitor the pressure inside the respective filtration device 120A and 120B. When the pressure reaches a certain predetermined level, the user may change the filter. For example, and not limitation, when either of the pressure gauges, 220A and 220B, indicate a pressure greater than 20 pounds per square inch ("psi"), then that filter has reached saturation. In an alternative embodiment, the filtration devices, 120A and 120B, may reach saturation at 30 psi. When the gauge indicates the saturation pressure has been reached, the user may replace the filter.

Figure 4:
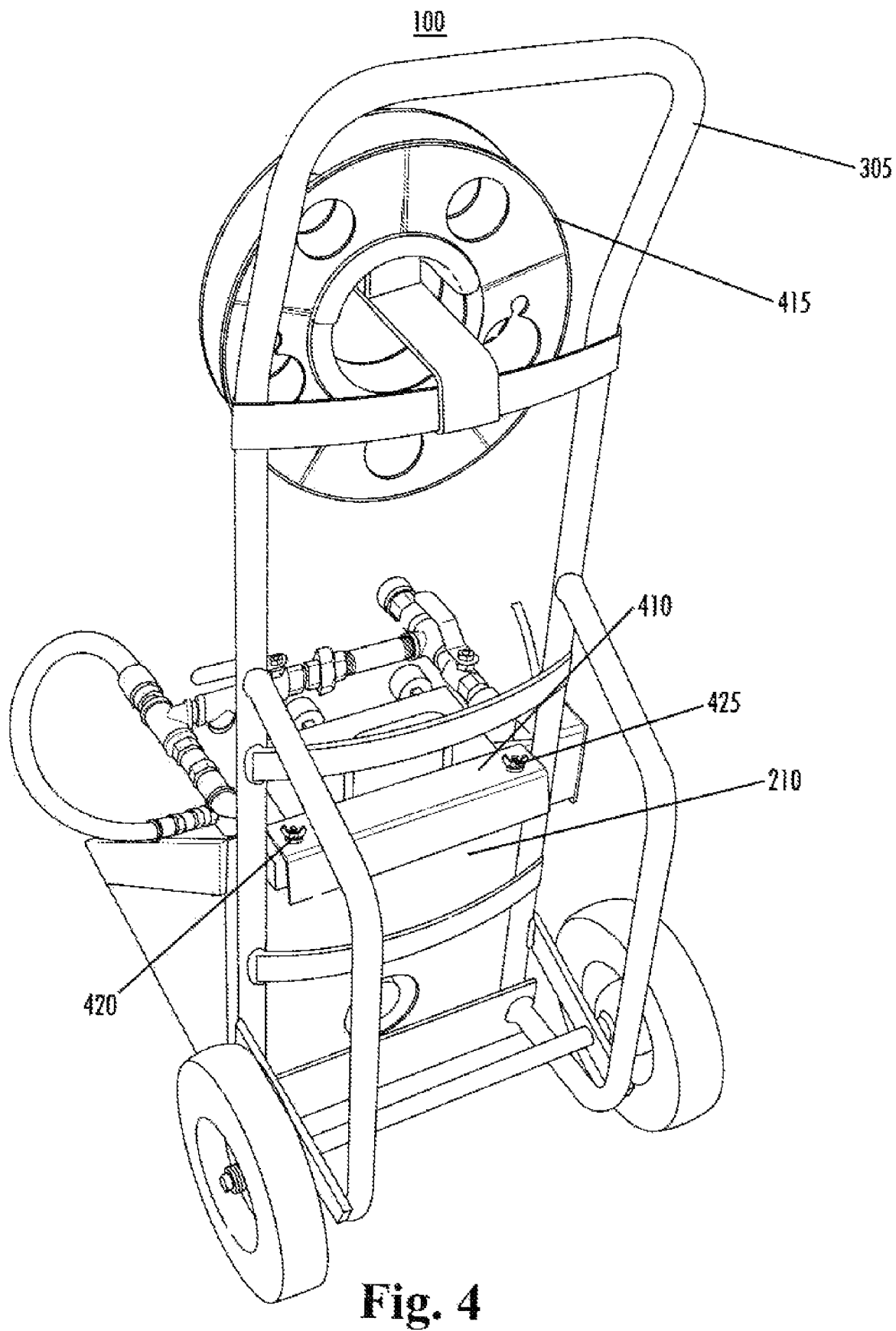
FIG. 4. depicts a rear view of an embodiment of the portable oil filtration system, in accordance with a preferred embodiment of the present invention.

FIG. 4. depicts a rear view of an embodiment of the portable oil filtration system. The portable oil filtration system 100 may be provided with a transport device 305. The portable oil filtration system 100 may be detachably connected to the transport device 305. This transport device 305 may be many types of devices capable of transporting the portable oil filtration system 100, such as a cart, dollie, trolley, or other wheeled apparatus. In the exemplary embodiment depicted in FIG. 4, the transport device 305 is a conventional set of hand trucks. The portable oil filtration system 100 may also be configured with a mounting apparatus 410. This mounting apparatus 410 may be many varieties of devices capable of suspending the portable oil filtration system 100 and supporting the weight of the portable oil filtration system 100, such as a set of hooks, a bracket, chain, or clamps. In the exemplary embodiment depicted in FIG. 4, the mounting apparatus 410 is an "L" shaped bracket which is mounted to the vertical support member 210. Additionally, the transport device 305 is provided with a mating bracket to the "L" shaped mounting apparatus 410. The mounting apparatus 410 may be secured to this mating bracket with a fastening device, such as a wingnut, bolt, or clamp. As shown in the exemplary embodiment in FIG. 4, wingnuts 420 and 425 can be used to removably attach the mounting apparatus 410 to the transporting device 305. Therefore, the portable oil filtration system 100 may be suspended from a support bar of the transport device 305. Additionally, the portable oil filtration system 100 may be detached from the transport device 305 such that it may be carried by user independent of the transport device 305. With the portable device body 105 suspended on the transport device 305, the transport device 305 is free to be wheeled about. Mounting the portable oil filtration system 100 on the transport device 305 enables the user to easily transport the portable oil filtration system 100 for long distances. Furthermore, the ability to detach the portable oil filtration system 100 from the transport device 305 enables the user to carry the portable oil filtration system 100 into areas that would be inaccessible to the transport device 305. For example, the portable oil filtration system 100 may be carried up a ladder to be positioned in close proximity to a vertically placed piece of equipment.

As shown in the exemplary embodiment depicted in FIG. 4, the portable device body 105 may provide a handle 430. The handle 430 depicted in FIG. 4 represents one embodiment of the handle, but those of skill in the art will appreciate that the handle 430 may be implemented in a variety of ways. The handle 430 may be many types of support members that permit the user to lift the portable device body 105. The handle may be sufficiently rigid and supportably connected to the portable device body 105 to support the entire weight of the portable oil filtration system 100 when being held by a user. In one embodiment, the handle 430 may be a leather strap or strap of a durable material attached to the top of the vertical support member 210. In the exemplary embodiment depicted in FIG. 4, the handle 430 is a metal "U" shaped member, which is mounted to the vertical support member 210. Significantly, the handle 430 may enable the user to pickup and carry the portable oil filtration system 100. Additionally, the user may be enabled to carry the portable oil filtration system 100.

The transport device 305 may also provide a storage facility for the excess electrical conduit used to power the portable oil filtration system 100. In the exemplary embodiment depicted in FIG. 4, a power cord reel 415 is mounted to the transport device 305 to permit storage of the excess power cord during transport and operation of the portable oil filtration system 100.

Those of skill in the art will appreciate that the portable oil filtration system 100 may be used in a variety of other machinery. Significantly, the portable oil filtration system 100 may service other types of machines while those machines are still in full operation. Thus the oil of other equipment within the power plant system can be reconditioned by the portable oil filtration system 100 without taking the equipment out of operation. In an exemplary embodiment, the portable oil filtration system 100 can be used to service the gear boxes located in the cooling tower of a power plant system. Therefore, the portable oil filtration system 100 can be transported to the cooling tower and used to filter the gear boxes while in operation. The portable oil filtration system 100 may be connected to gear boxes, and the oil of the drive units in the gear boxes may be serviced while the gear box remains in operation. Thus, the gear boxes may be efficiently and effectively serviced by the portable oil filtration system 100.

While the invention has been disclosed in its preferred forms, it will be apparent to those skilled in the art that many modifications, additions, and deletions can be made therein without departing from the spirit and scope of the invention and its equivalents, as set forth in the following claims.

What is claimed is:

1. A method of changing the oil in a forced draft fan assembly of a power plant, said forced draft fan assembly having a bearing housing, said method comprising the steps of:
   providing a portable filtration device comprising:
   a frame;
   a motor;
   a pump having a flowrate capacity of from 0.5 to 3 gpm and being connected to, and powered by said motor;
   an input valve in fluid communication with the pump for fluid connection with an output port of the bearing housing of the forced draft fan;
   at least one filter in fluid communication with the pump; and
   an output valve in fluid communication with said at least one filter for fluid connection with an input port of the bearing housing of the forced draft fan; said motor, pump, input valve, at least one filter and output valve all being mounted on said frame, said portable filtration device weighing less than fifty pounds, and being liftably detachable from an associated wheeled frame by a single user;
   precharging said portable filtration device with oil;
   transporting and connecting said portable filtration device to said bearing housing of said forced draft fan assembly;
   filtering oil contained within said bearing housing by pumping said oil from said bearing housing through said portable filtration device while said forced draft fan assembly is in operation, thereby resulting in a filtered oil, and
   returning said filtered oil to said bearing housing; and
   disconnecting said portable filtration device from said bearing housing.

2. The method of changing oil in a forced draft fan assembly of claim 1, wherein the step of precharging said portable filtration device includes pressurizing said portable filtration device to a first pressure level equivalent to a second pressure level in the bearing housing of the forced draft fan assembly.

* * * * *